US008886044B2

(12) United States Patent
Georgiano et al.

(10) Patent No.: US 8,886,044 B2
(45) Date of Patent: Nov. 11, 2014

(54) MULTI-CHANNEL FIBER OPTIC STATUS MONITORING DEVICE

(76) Inventors: Joseph Georgiano, Hicksville, NY (US); Irwin Math, Greenvale, NY (US)

( * ) Notice: Subject to any disclaimer, the term of this patent is extended or adjusted under 35 U.S.C. 154(b) by 133 days.

(21) Appl. No.: 13/349,005

(22) Filed: Jan. 12, 2012

(65) Prior Publication Data

US 2013/0034350 A1 Feb. 7, 2013

Related U.S. Application Data

(60) Provisional application No. 61/574,595, filed on Aug. 5, 2011.

(51) Int. Cl.
*H04B 10/00* (2013.01)
*H04B 10/12* (2006.01)

(52) U.S. Cl.
USPC ............................ 398/110; 398/140; 398/141

(58) Field of Classification Search
USPC ......................................... 398/140, 141, 110
See application file for complete search history.

(56) References Cited

U.S. PATENT DOCUMENTS 4,204,201 A 5/1980 Williams et al.
5,203,716 A 4/1993 Martucci et al.
6,944,360 B2 9/2005 Li et al.
7,612,654 B2 11/2009 Bender et al.
7,693,608 B2 4/2010 Nasle
7,755,432 B1 7/2010 Krishnamoorthy
2010/0008493 A1* 1/2010 Marum et al. ................ 379/386
2010/0315245 A1* 12/2010 Wofford ........................ 340/605

OTHER PUBLICATIONS

C.Cure 800/8000 Version 9.2 Document No. UM-037 Release Date: Oct. 2007.*
Fiber Optic Supervised Contact Closure Rev Jun. 2, 2010.*
Fiber Optic Supervised Contact Closure Transmission System Copyright 2010 Liteway, Inc.*
MLT 5014 Switch/ PRoximity Detector Interface. Aug. 2008.*

* cited by examiner

*Primary Examiner* — Mina Shalaby
(74) *Attorney, Agent, or Firm* — Thomas A. O'Rourke; Bodner & O'Rourke, LLP

(57) ABSTRACT

A detection system for remote monitoring of a contact condition comprises first, second, and third impedance means, and four comparators. Each impedance means is selectively coupled between the contact and the comparators. With a known voltage applied at the third impedance means, the three impedances produce a unique signal voltage at the comparators depending on a condition of the contact closure. Each comparator may detect one of the four unique voltages and produce an electrical signal corresponding to the detected condition, which may be converted into an optical signal, and be transmitted in a fiber optic cable to a receiver where it is converted back into an electrical signal. Four detectors are each adapted to detect one of the electrical signals, and trigger a relay and status LEDs, indicating a contact condition consisting of: normally open/closed, and short/open circuited. A fifth detector monitors for broken fiber optic cable.

16 Claims, 8 Drawing Sheets

(Block Diagram of Contact Closure System)

FIG. 7- Power Terminal Block Connections

| Pin | Function |
|---|---|
| 3 | AC or DC return (Common to Housing), Ground |
| 2 | +11 to 24 DC or AC |
| 1 | Alarm output for use with optional Alarm Sensing Unit ALM-1000. |

FIG 8- Signal Terminal Block Connections

Signal Terminal Block Connections are as follows;

| | | |
|---|---|---|
| Pins 1, 2 | = Channel 1 | Pins 9,10,11,12,13 = No connection |
| Pins 3, 4 | = Channel 2 | Pin 14= Connected to 16 for Normal |
| Pins 5, 6 | = Channel 3 | Pin 15= Connected to 16 for Alarm |
| Pins 7, 8 | = Channel 4 | Pin 16 = Alarm Common |

FIG. 1B

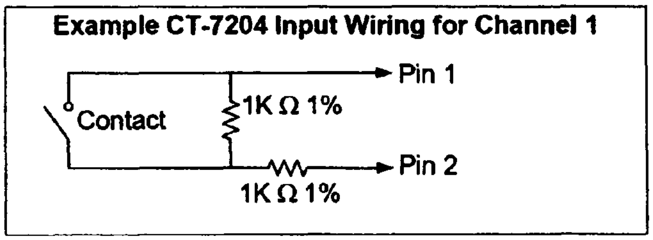

A contact state will be considered open for any of the conditions;

-- Inputs (e.g. 1 & 2) shorted together OR
-- Any of the wires are cut open OR
-- Contact switch is open.

To simulate a closed contact on a unused channel, on the CT-7204 connect a 1K ohm resistor between the channel input pins (e.g. pins 1 & pin 2)

(Block Diagram of Contact Closure System)

Z1 = Z2, Z3 = Z1 x 2

(Detail of Input Circuitry)

(Details of Receiver Circuitry)

FIG. 6- Technical Specifications

| | |
|---|---|
| Number of Channels | Four Independent Channels |
| Transmitter Input | Supervised Contact Closure |
| Receiver Output | Relay Contact Closure |
| Output Contact Switching | 0.5 A @ 125 VAC (62.5VA)<br>1.0A @ 24 VDC |
| Output Contact Carry Current | 2.0 Amps maximum |
| Output Contact Resistance | 100 milliohms maximum |
| Speed of Response | 300 ms maximum |
| Operating Wavelength | 850, 1310, or 1550 nm |
| Optical Output Power | -15dBm (multimode)<br>-15dBm (single mode) |
| Optical Loss Budget | 0-10dB (multimode) |
| Optical Connector | ST (multimode)<br>FCPC (single mode) |
| Signal Connector | Removable Terminal Block |
| Operating Temperature | -35° to +75°C |
| Power Requirements | 11-28 VAC/DC @110 mA |
| Physical Size (mm) | 5.0"(127) H X 1.0"(25.4) W X 3.0"(76) L |

MULTI-CHANNEL FIBER OPTIC STATUS MONITORING DEVICE

CROSS REFERENCES TO RELATED APPLICATIONS

This application claims priority on U.S. Provisional Application Ser. No. 61/574,595 filed on Aug. 5, 2011, the disclosures of which are incorporated herein by reference.

FIELD OF THE INVENTION

The present invention relates to improvements in detection of fault conditions in an electronic system to be supervised, and more particularly to apparatus which are capable of providing remote indication of an electronic system's performance.

BACKGROUND OF THE INVENTION

There are many electronic applications today that are critical for the maintenance of personal safety and security, and whose undetected failure may pose grave risks for those who depend upon them. Such systems may encompass many different types of electronic applications, and may include burglar alarms, fire alarms, motors, pumps, valve controls, etc. An operational system may have a contact switch that may be closed to activate the system, or be opened to deactivate the system. System failure can occur through the result of a short circuit or an open circuit, and the failure may continue unabated and pose a threat, without notification to the party at risk.

For example, a fire alarm at a business or college dorm in a major metropolitan location may fail and send a signal to the local fire department, which responds by rushing to the scene, only to determine that being summoned was the result of a false alarm due to a short. In many cities and regions, the fire department charges the firm or school a fee for the unnecessary response. Unfortunately, faults in many such alarms are typically only detected under these kinds of circumstances, or worse yet, in an actual emergency, where the failure of the device may conversely result in no notice to emergency responders, so that the response may not occur at all, or only after a Good Samaritan personally makes a call to summon help.

The invention disclosed herein provides notifications to a receiver that is mountable in a convenient location for personnel to routinely monitor the status of the system, where the notification may be for a switch contact being normally open, normally closed, short circuited, or failed due to an open circuit. In addition, the invention disclosed herein provides notification that the connection providing remote monitoring of the system status is broken, and that monitoring is therefore no longer even occurring.

OBJECTS OF THE INVENTION

It is an object of the invention to provide a means of detecting a fault in an electronic system application.

It is another object of the invention to provide a means of detecting a normally open and a normally closed condition of a contact switch.

It is a further object of the invention to provide a means of detecting a fault condition in the form of an open circuit or a shorted circuit condition.

It is another object of the invention to provide a means of remote monitoring of a trouble condition in a system application switch contact.

It is also an object of the invention to provide a means of determining a failure in the communication enabling remote monitoring of trouble conditions.

It is another object of the invention to provide a means of remote monitoring of a trouble condition in a system application using fiber optic communications.

Further objects and advantages of the invention will become apparent from the following description and claims, and from the accompanying drawings.

SUMMARY OF THE INVENTION

A fault detection system for remote alarm status monitoring may be comprised of a transmitter unit, a receiver unit, and a suitable length of fiber optic cable to connect the transmitter to the receiver. The transmitter portion of the invention may comprise comparators. The comparators may be generic op amps with additional circuitry to do the comparator function, or, alternatively, a comparator chip can be used, or the comparator may comprise discrete logic or transistors.

In a preferred embodiment, the transmitter portion may comprise four comparators and input circuitry. The input circuitry may be in the form of three separate impedance means (which may be resistive, capacitance, or inductive), where the first impedance means may be placed in parallel with the contact closure to be monitored, the second impedance may be placed between the contact and the transmitter, and the third impedance may be placed between a voltage source, Vcc, and the receiver to be in parallel with the second impedance. With such an arrangement, the impedance values may be coordinated to produce different predictable voltage values at the comparators, Vx, for various conditions of the circuit.

For example, where the impedances are selected such that $Z1=Z2$ and that $Z3=2\cdot Z1$, and: where the contacts are open in a normal condition, the voltage at the comparators will be $Vx=Vcc/2$; where the contacts are in a normal condition, the voltage at the comparators will be $Vx=Vcc/3.33$; where there is an open circuit, $Vx=Vcc$; and where there is a short circuit, $Vx=0$. The comparator recognizing the specific voltage corresponding to a particular circuit condition may deliver an electrical signal to an encoder that converts the electrical signal into a modulated optical signal and transmits it through the fiber optic cable to the receiver, where it is decoded and detected to provide a visual signal, in the form of a LED, to alert the user as to the circuit's status. The system herein may be used to monitor four separate contact closures over a single optical fiber conductor.

BRIEF DESCRIPTION OF THE DRAWINGS

FIG. 1B is a schematic of the input wiring for channel no. 1.

FIG. 6 lists the technical specifications for one embodiment of the current invention.

FIG. 7 lists the power terminal block connections.

FIG. 8 lists the signal terminal block connections.

DETAILED DESCRIPTION OF THE INVENTION

In many electronic applications, it is advantageous, if not critical, for the system to be supervised so that an observer may quickly be alerted to its status—whether it is fully operational and functional, being in a normal condition, or whether there is an electronic fault. It is also desirable for this notification to be delivered to a location remote from the system itself. Electronic faults may comprise a short circuit, an open circuit, or other fault condition, and may be reportable to the observer as a trouble condition. Moreover, it may be invaluable to the person monitoring an electrical system to also know the status of the supervising system—that it is fully functional and is actively monitoring the underlying system, and has not itself experienced an undetected failure. The present invention is therefore capable of remotely sensing valid states for a switch: intended close (on); intended open (off); unintended close (short); or unintended open (cut wires).

Figure 1:
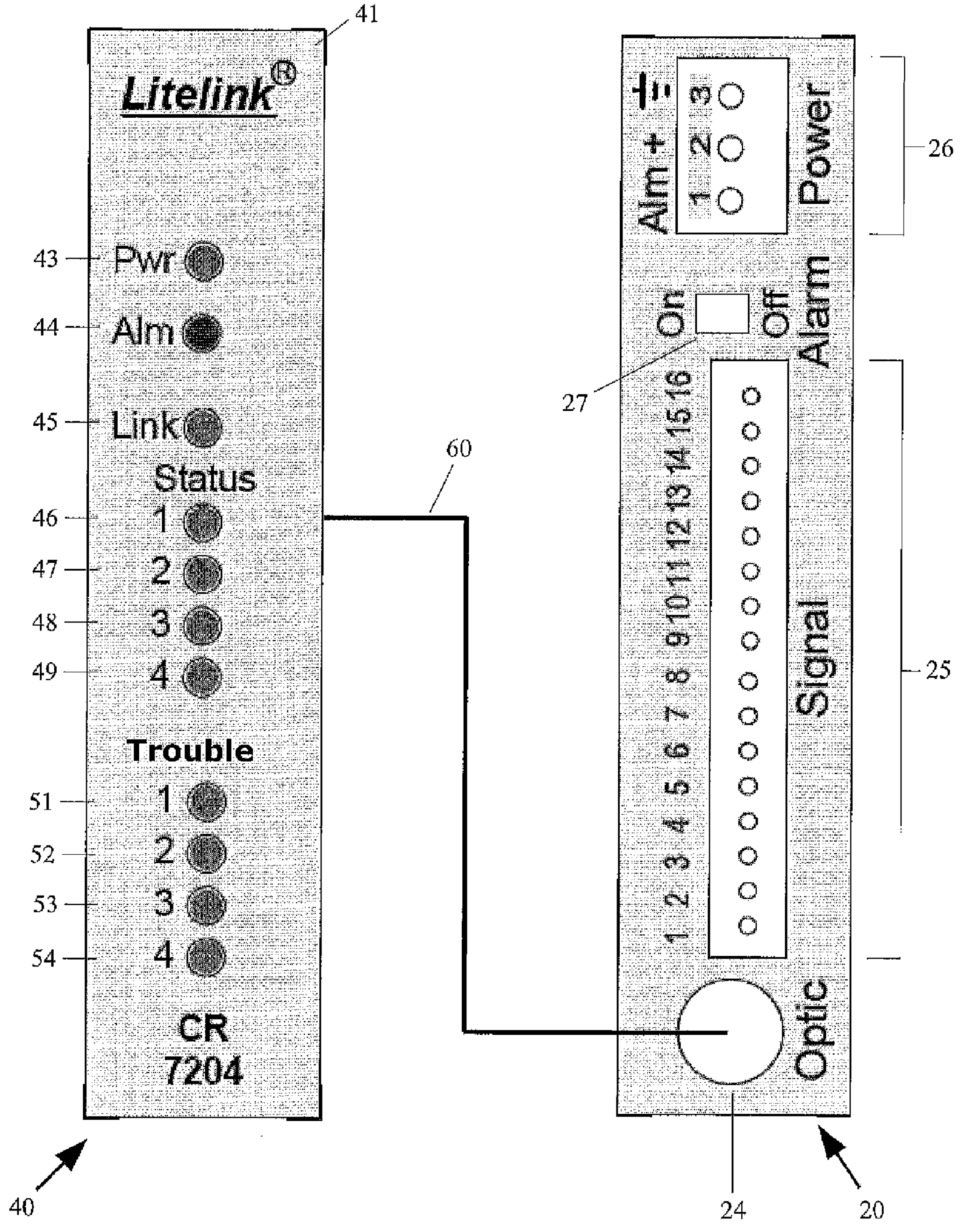
FIG. 1 is a front view of the receiver, and transmitter of the current invention, shown being connected schematically with fiber optic cable.

FIG. 1 shows a first embodiment of the present invention, which includes a transmitter 20, receiver 40, and cable 60, which may preferably be a fiber optic cable, but may also be wire-a twisted pair or coax. Receiver 40 may comprise a housing 41 to support the electronic circuitry therein. The housing 41 may comprise a plurality of orifices to expose at least a portion of a plurality of LED indicator lights, which may include a power LED 43, an alarm LED 44, a link LED 45, status LED numbers 1-4 (46-49), and may also include trouble LED numbers 1-4 (51-54). (Note that generic indicators, such as bulbs, electro-luminescence, etc., may be used as an alternative or in addition to the use of LEDs). The "Link" LED 45 may provide notification of a broken fiber optic cable. The four "Status" LEDs 46-49 may provide notification of the proper functioning within each of the four different underlying electronic systems that are being monitored by the device. These LEDs 46-49 may be green colored. The four "Trouble" LEDs 51-54, where utilized, may provide notification of a problem within any of the four different underlying electronic systems that are being monitored. These LEDs 46-49 may be red colored. Alternatively, rather than utilizing the separate trouble LEDs, indications may be only by the status LEDs, where a lighted green status LED indicates the system is ok, and an unlighted status LED indicates "trouble." In addition to the trouble LEDs 46-49, an alternative embodiment may incorporate individual trouble indicator LEDs into the device, where one of which may light up to indicate the particular type of trouble being detected (i.e., open circuit, short circuit . . . ).

Figure 1A:
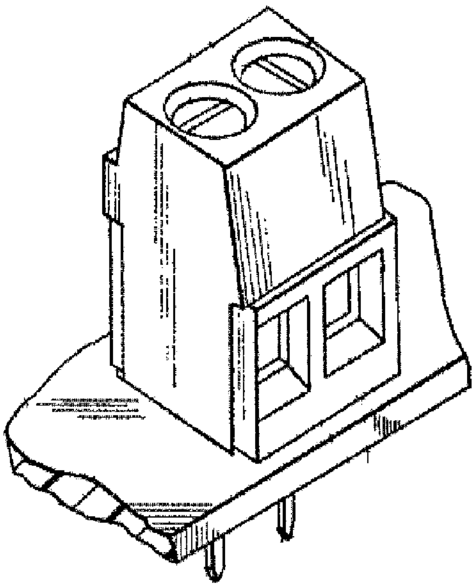
FIG. 1A (Prior Art)
FIG. 1A is a prior art terminal block connector usable for the transmitter portion of the current invention.

The transmitter 20 and receiver 40 may comprise separate units to permit convenient location of the detection portion of the invention—found within the transmitter unit- to be proximate to the contact, while the receiver may be more suitably located in an office or other convenient place where it may be routinely observed by personnel to permit quick resolution of any detected system problems. The transmitter 20 may comprise, for the convenience of the users of the system, a removable sixteen block terminal connector 25. The connector may be a standard European removable terminal block, having 16 positions with each being 3.50 millimeters. The block may accept 16 to 24 AWG wire gauge, and the connectors may have a 300V, 8A electrical rating, with wire strip length of 5.0 mm, and max torque of 3 in-lbs. Suitable manufacturers and part numbers include: the Molex 39500-0116, 39351-0016, and the On Shore ED1550-16-BK/12345 L-R. The stripped wire of the underlying system goes into the connectors, and a screw on top of each connector clamps down onto each wire making electrical contact with connector. The terminal block connector 25 may plug into the housing of transmitter 20. The terminal block 25 may comprise multiple instances of the prior art terminal block reproduced in FIG. 1A from U.S. Pat. No. 5,203,716 to Martucci, or it may be the terminal block available from Molex in Lisle, Ill., which may be found at www.molex.com/pdm_docs/sd/395000016_sd.pdf, with the disclosures of each being incorporated herein by reference. Standard connections for the terminal block 25 are shown in Table 3. Also, the connections to the power block 26 of transmitter 20 are shown in Table 2. The transmitter 20 may also comprise an on/off alarm switch 27.

The connection between transmitter 20 and receiver 40 may comprise a cable, preferably being a fiber optic cable, which may connect to optic port 24 on transmitter 20. Fiber optic cable offers numerous advantages over a hard-wired connection. Fiber optic networks operate at very high speeds, and may transmit many terabits per second (Tera being one trillion) over a 160 kilometer distance (see NTT Corp. news release on Sep. 29, 2006, titled "14 Tbps over a Single Optical Fiber: Successful Demonstration of World's Largest Capacity," available at http://www.ntt.co.jp/news/news06e/0609/060929a.html) The fiber optic signal can thus also be transmitted much farther without needing to be boosted or strengthened. Fiber optic transmissions also offer better resistance to electromagnetic noise, they are immune to lightening strikes, and it costs less to maintain. Lastly, wire melts at a lower temperature than the glass optical fiber, which is an important feature when the device is used in a fire alarm system, and there is concern for maintaining system integrity in a building fire situation. All of these advantages serve to increase the robustness of the device, for its use in conjunction with a safety-critical underlying system.

Therefore, while the invention herein may be practiced using conventional cable, it may preferably be practiced with the use of fiber optic cable. Use of fiber optic cable requires converting an electrical signal to an optical signal using a transmitter 20, which then transmits the optical signal through the fiber, and a receiver for receiving the optical signal and converting it into an electrical signal. The fiber optic cable used with the invention herein may be either a single mode type of fiber optic cable, or a multi-mode type of fiber optic cable. The transmitter, receiver, and cable may therefore need to be adapted to be compatible with each other. In one embodiment, they may each be selected for transmission of an 850 nm multimode signal. In another embodiment they may be selected for transmission of a 1310 nm multimode signal. In other embodiments they may be selected for transmission of a 1310 nm or a 1550 nm single-mode transmission. Table 1 lists technical specifications for one embodiment of the current invention to be illustrative, and is not intended to be limiting as to the technical specifications for other possible embodiments of the invention herein.

Figure 2:
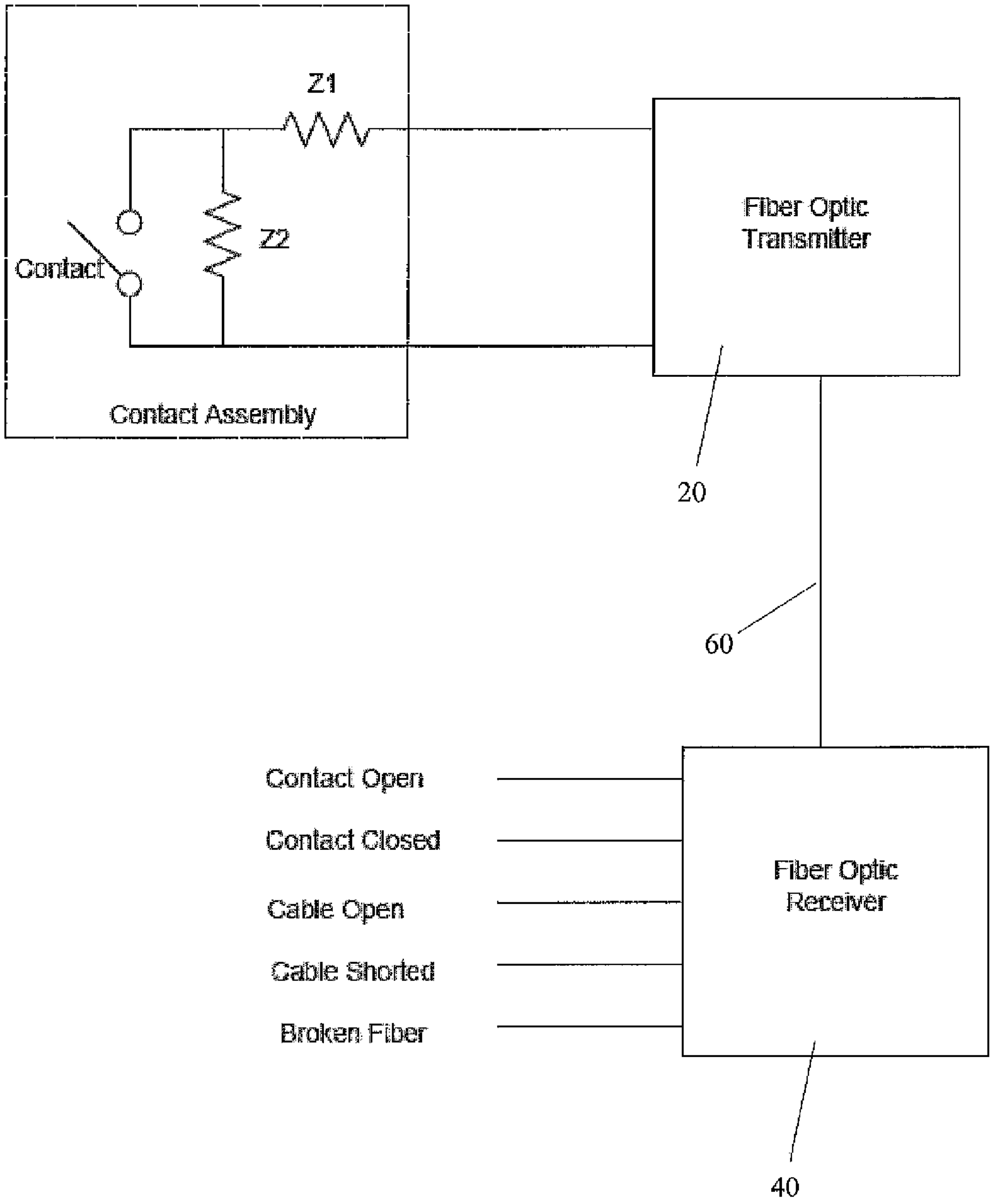
FIG. 2 is a block diagram of the contact closure system of the current invention.

As seen in the block diagram of FIG. 2, fiber optic transmitter 20 may be electrically coupled to a subject system that is to be monitored using the invention disclosed herein. The invention may be used to monitor fire alarm systems, burglar alarm systems, a motor, a pump, a valve control, etc. The transmitter 20 may also be connected, as previously described, to fiber optic receiver 40 using fiber optic cable 60.

Figure 3:
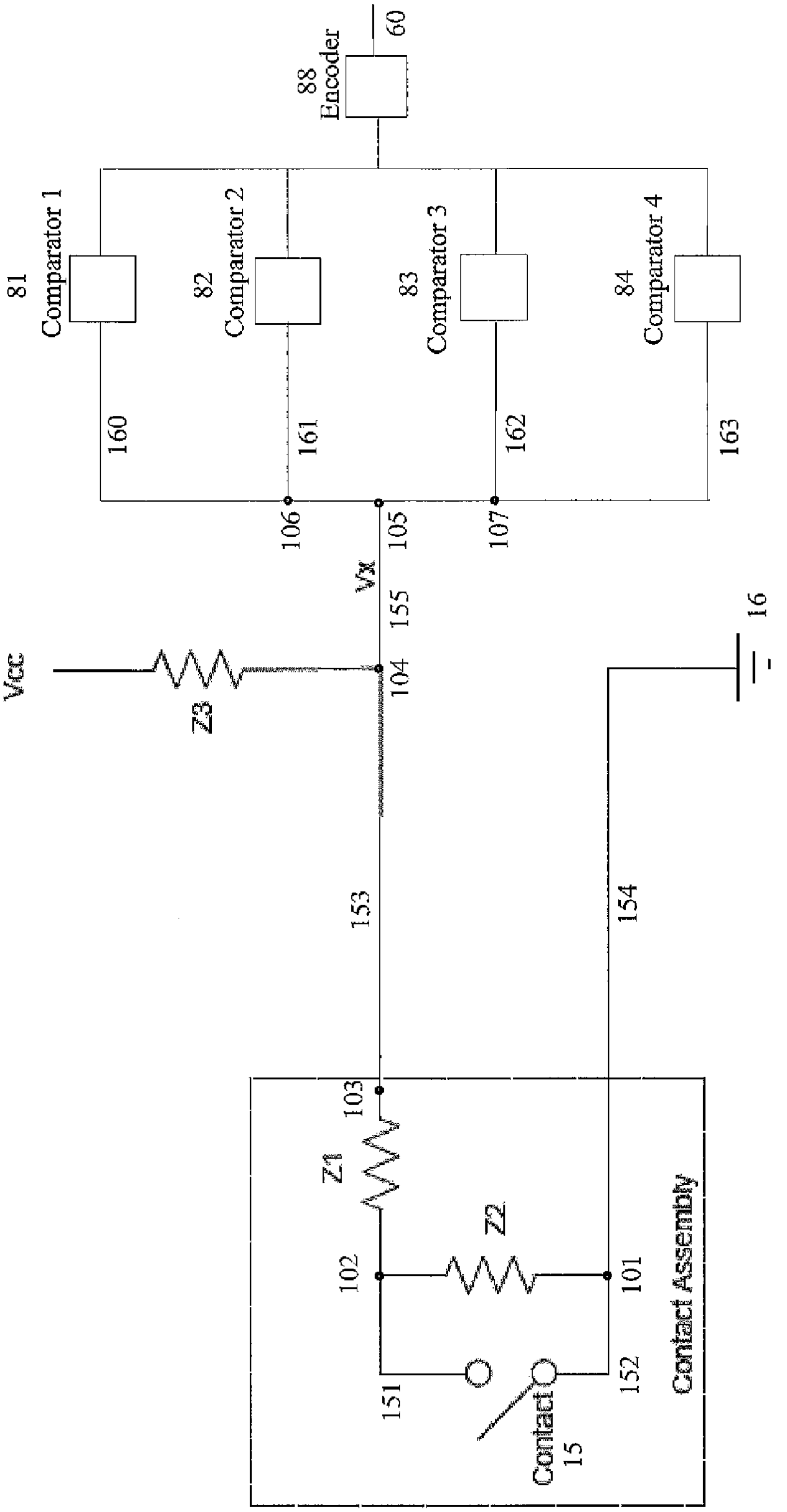
FIG. 3 is a schematic of the input circuitry of the current invention.

FIG. 3 illustrates operation of the Input Circuitry. In one embodiment of the present invention, three different impedances, Z1, Z2, and Z3, may be selectively arranged around the contact to be monitored, as shown. Generally speaking, impedance is the degree to which an electrical circuit resists current flow when a voltage is applied across its terminals. In alternating current circuits, impedance is a function of the resistance, the inductance, and the capacitance therein. Electrical components in the form of inductors and capacitors build up voltages, which serves to oppose the flow of current in the circuit in a phenomenon known as reactance. Where a mix of electrical components is used in a circuit, the total impedance therein is the sum of the total resistance and total reactance of the components in the circuit.

As seen in FIG. 3, impedance Z2 may be wired to be in parallel with the contact switch 15 that is to be monitored, and may connect to wire 151 at point 102, as well as to wire 152 at point 101. Beyond point 101, a wire 154 may connect to ground 16. Impedance Z1 may have one end that also connects to end wire 151 at point 102 and a second end that connects to wire 153 at point 103. Impedance Z3 may have one end connected to wire 153 at point 104, and a second end may be connected to a known or measured voltage, Vcc. Wire 155 may connect between point 103 and point 105, where it may connect to wire 156 and 157. Wire 156 may further split at point 106 into wire 160 and 161, with wire 160 providing a connection to a first comparator 81, and wire 161 providing a connection to a second comparator 82. Wire 157 may also split at point 107 into wires 162 and 163, with wire 162 providing a connection to a third comparator 83, and wire 163 providing a connection to a fourth comparator 84.

Determination of a fault condition or normal operating condition through operation of the input circuitry is dependent upon recognition of a unique voltage Vx in wire 155 in the circuit (FIG. 3), which may result from the particular condition of the circuit. In one embodiment, the value of impedance Z1 is equal to the value of impedance Z2 (so, Z1=Z2), and the value of impedance Z3 may be equal to twice the impedance value of Z1 (so, Z3=2·Z1). Each of the comparators 81-84 is selected to be able to recognize a certain voltage value for the variable Vx, which corresponds to the different circuit condition, which may be predictable with these known impedance differences and possible fault conditions. Recognition of the appropriate voltage by one of the comparators diagnoses the status of the circuit.

For example, in the above embodiment, where the contacts are open in a normal condition, Vx=Vcc/2. Where the contacts are closed in a normal condition, Vx=Vcc/3.33. The present invention is also capable of detecting an open circuit in wire 153 due to a break, because in that case, Vx=Vcc. Where there is a short in the wire 153, Vx=0. Each comparator is therefore selected to recognize those voltage conditions. Upon recognition of the particular voltage condition, the comparator delivers an electrical signal to encoder 88. The encoder 88 portion of the transmitter may encode the electrical signals defining the various states, into modulated optical signals, which is then launched into fiber optic cable 60.

Figure 4:
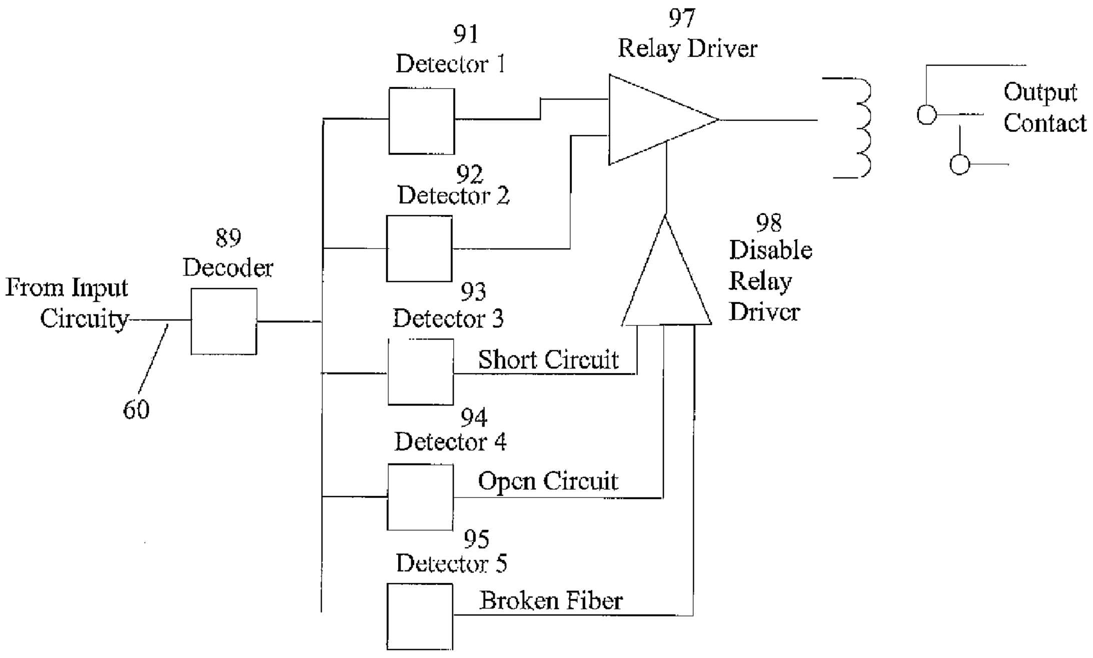
FIG. 4 is a schematic of receiver circuitry of the current invention.

The modulated optical signals are transmitted through fiber optic cable 60 to receiver 40, where, as seen in the receiver circuitry of FIG. 4, decoder 89 decodes the modulated optical signals back into an electrical signal. The resulting decoded signal is applied to the four detectors 91-94, each of which is designed to operate with the specific signal. The output of two detectors is used to trigger the output contact relay (for normal signals) or and other detectors to trigger a disable relay for various fault indicators.

A fifth overall signal detector 95 is also connected to the detected decoded signal to signal a loss of all signals, which would be an indication of a fifth condition—a broken fiber. Since there is always a signal if the fiber optic cable is intact, the loss of any signal signifies a broken fiber. It should be noted that upon activation of the broken fiber detector, the contact relay is de-energized.

The relay driver 97 is application specific, because in certain circumstances, detection of a fault condition may warrant shutting down the system's applications, and conversely, for example with a system to alert a fire department, a short may not warrant shutting down the system, but must provide the necessary alert so that the system may be repaired. Also, in the case of a burglar alarm, where there is a short, it may be desirable to have the ability to determine if the premises being protected were breached before the short occurred. If it was not, a response may necessarily be different.

Figure 5:
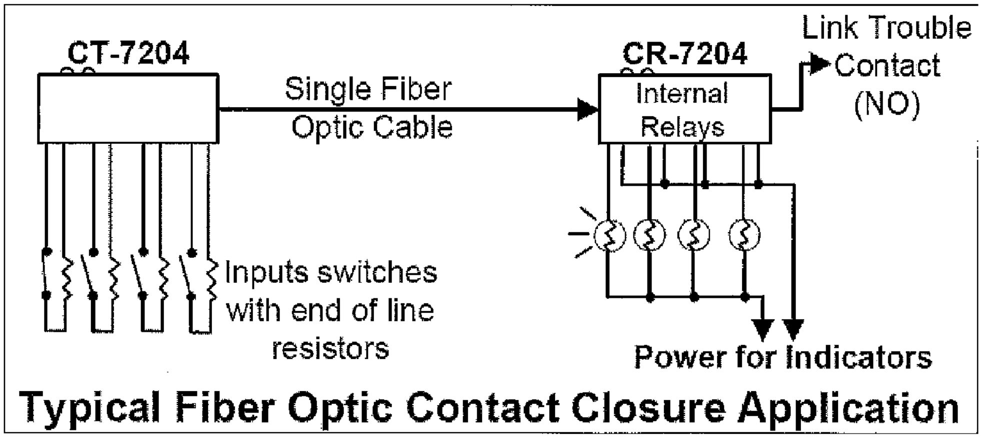
FIG. 5 represents a typically fiber optic contact closure application.

The system disclosed herein may be used to monitor four separate contact closures over a single optical fiber conductor, as illustrated schematically in FIG. 5.

The examples and descriptions provided merely illustrate a preferred embodiment of the present invention. Those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the preferred embodiment without departing from the spirit of this invention.

TABLE 1

| Technical Specifications | |
|---|---|
| Number of Channels | Four Independent Channels |
| Transmitter Input | Supervised Contact Closure |
| Receiver Output | Relay Contact Closure |
| Output Contact Switching | 0.5 A @ 125 VAC (62.5 VA)<br>1.0 A @ 24 VDC |
| Output Contact Carry Current | 2.0 Amps maximum |
| Output Contact Resistance | 100 milliohms maximum |
| Speed of Response | 300 ms maximum |
| Operating Wavelength | 850, 1310, or 1550 nm |
| Optical Output Power | −15 dBm (multimode)<br>−15 dBm (single mode) |
| Optical Loss Budget | 0-10 dB (multimode) |
| Optical Connector | ST (multimode)<br>FCPC (single mode) |
| Signal Connector | Removable Terminal Block |
| Operating Temperature | −35° to +75° C. |
| Power Requirements | 11-28 VAC/DC @110 mA |
| Physical Size (mm) | 5.0"(127) H × 1.0"(25.4) W × 3.0"(76) L |

We claim:

1. A detection system for remote status monitoring of one or more possible conditions of a contact closure, said detection system comprising:

a first impedance means (Z1), a second impedance means (Z2), and a third impedance means (Z3);

one or more comparators; said first, second, and third impedance means being selectively coupled between said contact closure and said one or more comparators;

a known voltage (Vcc) being applied at said third impedance means; said selectively coupled first, second, and third impedance means configured to produce a signal voltage (Vx) at said one or more comparators, said signal voltage being unique for each said one or more conditions of said contact closure; each of said one or more comparators configured to respectively detect one of said unique signal voltages and to produce an electrical signal corresponding to said detected condition;

an encoder, said encoder configured to convert said electrical signal of said one or more comparators into a modulated optical signal;

a transmitter;

a fiber optic cable, said transmitter configured to transmit said modulated optical signal over said fiber optic cable;

a receiver, said receiver being coupled to said fiber optic cable and configured to receive said modulated optical signal;

a decoder, said decoder configured to convert said received optical signal into said electrical signal;

one or more detectors, each said one or more detectors respectively configured to detect one of said unique electrical signals for said corresponding contact closure conditions;

an output relay and one or more status indicator lights, said output relay configured to respectively light up one of said one or more status indicator lights for said corresponding contact closure condition.

2. The detection system according to claim 1, wherein said one or more possible conditions of said contact closure comprises: a normally open condition, a normally closed condition, a short circuit condition, and an open circuit condition; wherein said one or more comparators comprises a first, a second, a third, and a fourth comparator; and wherein each of said first, second, third, and fourth comparators are configured to detect said unique electrical signal respectively corresponding to one of said contact closure conditions.

3. The detection system according to claim 1, further comprising a link light, and wherein said one or more detectors comprises a fifth detector configured to detect a fifth condition comprising said fiber optic cable being broken, with said fifth detector configured to detect the loss of said optical signal; and wherein said fifth detector is further configured to signal said output relay to light up said link light when said fiber optic cable is broken.

4. The detection system according to claim 2, wherein said one or more status indicator lights comprises a first, a second, a third, and a fourth status indicator light; and wherein said output relay is configured to light up said first status indicator light when said first detector detects said normally open condition, and is further configured to light up said second status indicator light when said second detector detects said normally closed condition.

5. The detection system according to claim 4, further comprising a disable relay driver coupled between said output relay and each of said third and fourth detectors, said third and fourth detectors respectively configured to detect said short circuit condition and said open circuit condition; and wherein when said short circuit condition or said open circuit condition is detected by said detectors, said disable relay is configured to shut down a system application; said output relay configured to light up said third indicator light when said short circuit condition is detected, and to light up said fourth indicator light when said open circuit condition is detected.

6. The detection system according to claim 4, further comprising a third indicator light, a fourth indicator light, and a disable relay driver coupled between said output relay and each of said third and fourth detectors, said third and fourth detectors respectively configured to detect said short circuit condition and said open circuit condition; and wherein when said short circuit condition or said open circuit condition is detected by said detectors, said disable relay is configured to shut down a system application; said output relay configured to light up said third indicator light when said short circuit condition is detected, and to light up said fourth indicator light when said open circuit condition is detected.

7. The detection system according to claim 5, further comprising a link light, and wherein said one or more detectors comprises a fifth detector configured to detect a condition of said contact closure comprising said fiber optic cable being broken, with said fifth detector configured to detect the loss of said optical signal; and wherein said output relay is configured to light up said link light when said fifth detector detects said fiber optic cable being broken.

8. The detection system according to claim 7, wherein said first impedance means has a value equal to said second impedance means (Z1=Z2), and wherein said third impedance means has a value equal to twice that of said first impedance means (Z3=2·Z1).

9. The detection system according to claim 7, further comprising a power light; and wherein said output relay is configured to light up said power light to provide notification when said detection system is turned on.

10. The detection system according to claim 7, wherein said first impedance means has a value equal to said second impedance means (Z1=Z2), and wherein said third impedance means has a value equal to twice that of said first impedance means (Z3=2·Z1).

11. The detection system according to claim 8, wherein when said contact closure is in a normally open condition, Vx=Vcc/2; and wherein said contact closure is in a normally closed condition, Vx=Vcc/3.33; and wherein when said contact is in an open circuit condition, Vx=Vcc; and wherein when said contact is in a short circuit condition, Vx=0.

12. The detection system according to claim 8, wherein when said contact closure is in a normally open condition, Vx=Vcc/2; and wherein said contact closure is in a normally closed condition, Vx=Vcc/3.33; and wherein when said contact is in an open circuit condition, Vx=Vcc; and wherein when said contact is in a short circuit condition, Vx=0.

13. The detection system according to claim 11, wherein a status of four separate contact closures is monitored using said fiber optic cable.

14. The detection system according to claim 11, wherein a status of four separate contact closures is monitored using said fiber optic cable.

15. The detection system according to claim 13, further comprising a power light; and wherein said output relay is configured to light up said power light to provide notification when said detection system is turned on.

16. A detection system for remote status monitoring of one or more possible conditions of a contact closure, including a normally open condition, a normally closed condition, a short circuit condition, and an open circuit condition, said detection system comprising:

a first impedance means (Z1), a second impedance means (Z2), and a third impedance means (Z3);

one or more comparators, said one or more comparators comprising a first comparator, a second comparator, a third comparator, and a fourth comparator; said first, second, and third impedance means being selectively coupled between said contact closure and said one or more comparators;

a known voltage (Vcc) being applied at said third impedance means; said selectively coupled first, second, and third impedance means configured to produce a signal voltage (Vx) at said one or more comparators, said signal voltage being unique for each of said plurality of conditions of said contact closure; each of said one or more comparators configured to respectively detect one of said unique signal voltages and to produce an electrical signal corresponding to said detected condition;

an encoder, said encoder configured to convert said electrical signal of said one or more comparators into a modulated optical signal;

a transmitter;

a fiber optic cable, said transmitter configured to transmit said modulated optical signal over said fiber optic cable;

a receiver, said receiver being coupled to said fiber optic cable and configured to receive said modulated optical signal;

a decoder, said decoder configured to convert said received optical signal into said electrical signal;

one or more detectors, said one or more detectors comprising a first detector, a second detector, a third detector, and a fourth detector, wherein each of said detectors is respectively configured to detect one of said electrical signals for said corresponding contact closure conditions;

an output relay, said first, second, third, and fourth detectors coupled to said output relay, said first and second detectors respectively configured to detect said normally open condition and said normally closed condition of said contact closure; and one or more status indicator lights, said one or more status indicator lights comprising a first indicator light and a second indicator light, said output relay configured to respectively light up said first indicator light and said second indicator light when said first detector detects said normally open condition, and when said second detector detects said normally closed condition.

* * * * *